Nov. 14, 1939.   J. MIHALYI   2,180,013

PHOTOGRAPHIC APPARATUS

Filed Sept. 23, 1937

Joseph Mihalyi
INVENTOR

BY *Newton N. Perrins*
*Rolla L. Carter*
ATTORNEYS

Patented Nov. 14, 1939

2,180,013

UNITED STATES PATENT OFFICE 2,180,013

PHOTOGRAPHIC APPARATUS

Joseph Mihalyi, Rochester, N. Y., assignor to Eastman Kodak Company, Rochester, N. Y., a corporation of New Jersey Application September 23, 1937, Serial No. 165,357

3 Claims. (Cl. 88—1.5)

This invention relates to photographic cameras and more particularly to cameras of the reflex or twin-lens finder type providing an image of substantially the size of the picture taken by the cameras.

In cameras of this type the finder is usually provided with a collapsible or folding hood for eliminating any deterimental laterally incident light. Such finder construction is very convenient when the camera is held at or near waist level but when, as frequently happens, it is desirable to employ the camera at or near eye level it is very awkward if not entirely unsatisfactory.

It is an object of the invention to provide the hood of a reflex type finder with a mirror system so arranged as to effect an erect finder field when the camera is used at eye level.

Another object of the invention is the provision of an image erecting mirror system which is collapsible with the hood and which is collapsible in the hood to permit using the finder in the conventional way.

Another object of the invention is to provide a range finder built into a twin-lens type of camera and coupled to the focusing mechanism so as to make feasible the use of a brilliant type finder.

Other objects and advantages of the invention will appear from the following description of a specific embodiment when read in connection with the accompanying drawing in which.

Figure 1:
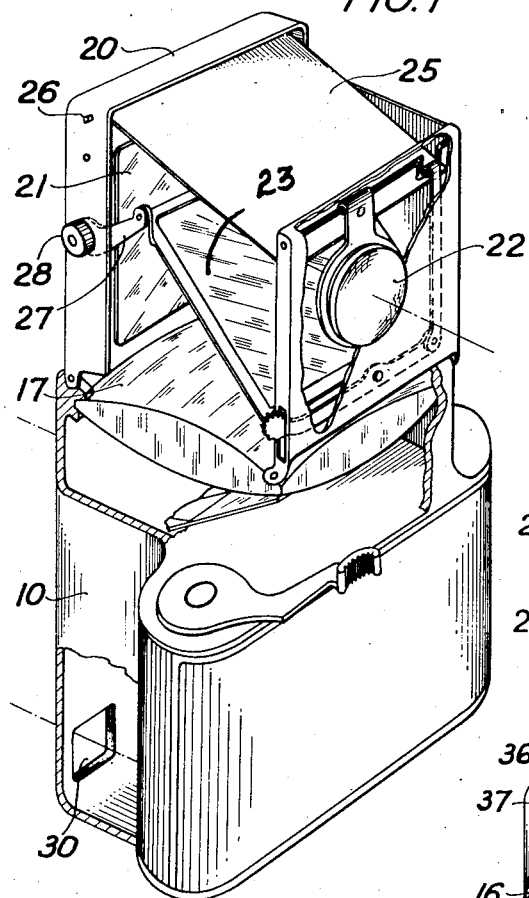
Fig. 1 is a view in perspective with portions torn away of a camera provided with an image erecting finder system in position for use at eye level.

The specific embodiment shown in the drawing as illustrative of the invention comprises a twin lens type of camera 10 having an objective lens 11 suitably carried by a support 12 secured to the camera 10 and movable by means of a lever 13 in any well known manner for focusing.

It is to be understood that structural features forming no part of the present invention are either omitted or shown in a conventional manner. However, enough of the camera structure is shown to enable anyone skilled in the art to understand the invention and to apply it to other cameras of a similar type such as those employing a movable mirror for utilizing the camera objective for view finding purposes.

The body of the camera 10 is provided with a horizontal partition 14 separating the exposure chamber from the finder chamber which is preferably provided in the upper half of the camera casing as illustrated. The finder chamber is provided with a mirror 15 positioned at an angle in the finder chamber so as to direct light from a finder lens 16 through a finder field lens 17 in a known manner. The field lens 17 may, of course, be provided with an image receiving surface or may be replaced with an ordinary ground glass. However, the finder is preferably of the brilliant type. The finder lens 16 is adapted to form an image at or near the lower surface of the field lens 17.

Figure 3:
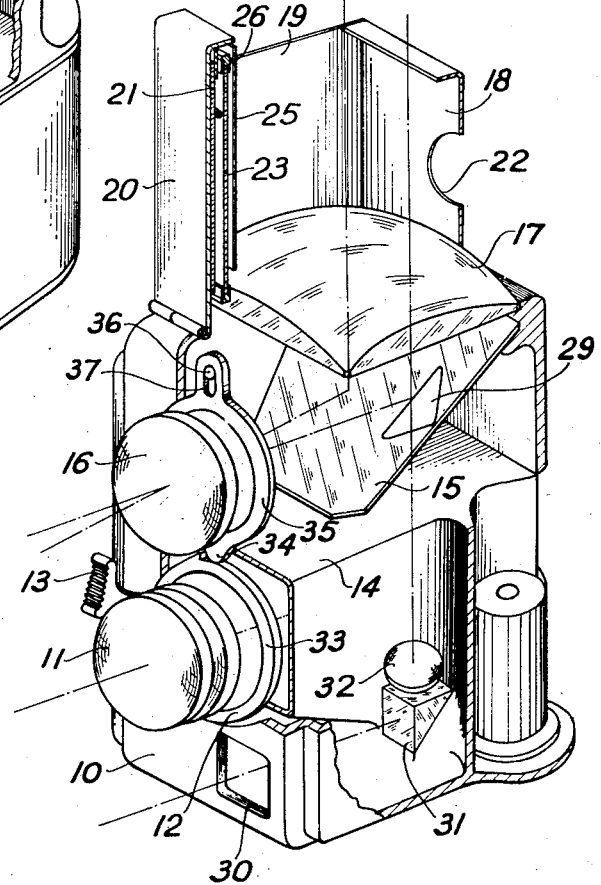
Fig. 3 is a front view in perspective and partly in section showing the range finder and the finder hood in position for use in the conventional way.

With the arrangement just described and as shown in Fig. 3, a brilliant image of the field of view is observable in the field lens 17 and is of substantially the same size as the picture image formed by the camera objective lens 11.

In order to eliminate any detrimental laterally incident light which might interfere with the observation of this finder image, field lens 17 is surrounded with an upwardly extending hood including members 18, 19 and 20 which may be made collapsible in any suitable manner such as by hingedly mounting them to the body of the camera 10 so that they may be folded to reduce the overall size of the camera for convenient transportation.

Figure 2:
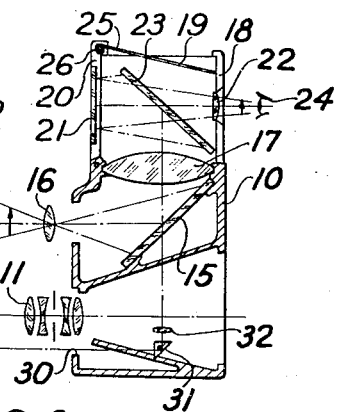
Fig. 2 is a sectional view of the camera showing the pertinent parts incorporating the invention.

It is frequently desirable to employ a camera of this type at eye level and, in accordance with the invention, the use of the finder at eye level is made convenient by including within the hood members 18, 19 and 20, optical means for providing an erect image of the field of view which is visible to an observer in the direction of the picture field. One suitable arrangement for accomplishing this result is illustrated in Figs. 1 and 2 as comprising a mirror 21 carried on the rear face of the front hood member 20. The rear hood member 18 is provided with a central viewing opening which may include a very weak eye lens 22. The finder image in the field lens 17 is made visible through the viewing opening 22 by positioning over the field lens 17 and between the opening 22 and the mirror 21, a semi-transparent mirror 23 arranged at the proper angle for directing on to the mirror 21 and for transmitting light reflected by the mirror 21. With this arrangement it is evident that to an observer 24 looking through the viewing opening 22 the finder image will appear in a vertical plane and will be erect.

When the camera is used at eye level, the hood is supplemented with a cover member 25 which may be hinged to the upper part of the front hood member 20 by means of a pin 26. This top member 25 darkens the interior of the hood, thereby increasing the visibility of the finder image.

The semi-transparent mirror 23 is preferably supported by an arm 27 pivoted in the front hood member 20 and rotatable by means of a small knob 28 to swing the mirror 23 into a position parallel to the mirror 21 as shown in Fig. 3. This operation makes it possible to swing the top hood member 25 about its pivot 26 into the position shown in Fig. 3, thereby rendering the finder useable at waist level in the conventional way.

Figure 4:
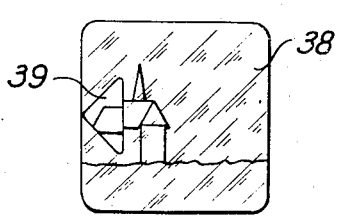
Fig. 4 shows the range and view finder field as it appears to the camera user.

The usual finder on reflex or twin-lens types of cameras are usually provided with an image receiving plane or surface so that the finder lens may be focused which focusing action is coupled to the camera objective lens so that when the finder image is in sharp focus the camera is properly focused. Any such image fixing medium necessarily greatly reduces the light which would be available for providing the erected image in accordance with the invention and, accordingly, another feature of the invention contemplates the provision of a range finder which permits the employment of a brilliant type finder. Such range finder may be of the mutilated image type, the finder image being destroyed in a small section by rendering a portion 29 of the mirror 15 non-reflecting such as by cutting out or unsilvering this portion 29. This non-reflecting portion 29 thus becomes light transmitting. The lower front face of the cemera 10 is provided with an opening or a window 30 behind which is positioned a right angle prism 31 for receiving light transmitted by the window 30 and directing it vertically upwards through the light transmitting portion 29 of the mirror 15. In the path of the light accepted by the window 30 is positioned a secondary finder lens 32 which forms an image in the same plane as the image formed by the main finder lens 16. Lens 32 is preferably of the same focal length as the main finder lens 16 so that the two images appearing in this common plane will have the same magnification. The separation of the main finder lens 16 and the beam accepting window 30 provides the base for the range finder and the two images formed by the finder lenses 16 and 32 may be brought into coincidence in accordance with the focusing adjustment of the main camera lens 11 by providing some suitable arrangement whereby the focusing adjustment of the camera lens 11 shifts one or both of the finder images. In the embodiment of the invention illustrated, the main finder lens 16 is given this adjustment which not only furnishes the relative movement of the two finder images for range finding purposes, but also performs a very desirable function of compensating for parallax in the view finder. Any suitable coupling between the main finder lens 16 and the focusing movement of the camera objective 11 may be employed and is shown in Fig. 3 as comprising a cam 33 adapted to be rotated upon movement of the camera lens focusing lever 13 and a cam follower 34 carried by a ring 35 which is adapted to support the main finder lens 16. This lens supporting ring 35 is suitably mounted on the camera 10 for vertical adjustment as by a pin and vertical slot arrangement 36 and 37, respectively. It is thus seen that movement of the lever 13 for altering the focus of the camera lens 11 rotates cam 33 to shift in a vertical direction the main finder lens 16. This shifting of the lens 16 shifts the main finder field 38 (Fig. 4) relative to the secondary image 39 and the coupling is such that when the two images 38 and 39 form a complete non-mutilated image, the main camera objective 11 is properly focused. As was pointed out above, this vertical shift of the finder lens 16 for range finding purposes also compensates for parallax due to the separation of this lens and the main camera lens 11.

It will be evident from the above that the arrangement afforded by the invention may assume various forms and may be employed in connection with cameras in which the camera objective lens also functions as the main finder lens by providing a movable mirror as is well known. Inasmuch as the main finder lens 16 in a twin-lens type of camera forms only an aerial image which is made visible by the field lens 17, it does not need to be a high quality lens such as is desirable when its image is fixed and employed for focusing purposes.

Although the finder image erecting system of the invention is particularly adapted for use with a brilliant type finder, it is obvious that it may be employed with other types of finders such as those employing a ground glass.

While I have illustrated and described in detail one specific embodiment of the invention, it is to be understood that this embodiment is illustrative only and that the invention embraces the many modifications which, to those skilled in the art, are obvious from the above specification.

What I claim and desire to be secured by Letters Patent of the United States is:

1. A camera finder including a field lens, an objective lens and reflecting means for forming an image substantially in the plane of the field lens, a mirror positioned in a plane substantially parallel to the optic axis of the field lens, an ocular spaced from the mirror, and a semi-transparent reflecting member for reflecting light from the image at the field lens onto said mirror and for transmitting the light from said mirror to said ocular.

2. A camera finder of the reflecting type including an objective lens and a horizontal field lens substantially in the plane of the image formed by the objective lens, a hood including front and rear walls projecting upwardly around said field lens, a rearwardly facing mirror carried by the front wall, an ocular carried by the rear wall, and a semi-transparent reflecting member mounted between said mirror and the ocular and above said field lens, said member being so positioned that it reflects onto said mirror light coming from said field lens.

3. A photographic camera finder having a housing, a reflector in the housing, a viewing element in the path of light rays reflected by the reflector, a collapsible hood on the housing above the viewing element and having front and rear wall sections, an observation window in the rear wall section, a mirror in the front wall section, and means between said window and said mirror for directing light received from said viewing element onto said mirror and for transmitting light from said mirror to said window.

JOSEPH MIHALYI.